United States Patent [19]
Atkinson

[11] Patent Number: 5,936,188
[45] Date of Patent: Aug. 10, 1999

[54] MISSILE WITH A SAFE ROCKET IGNITION SYSTEM

[75] Inventor: Bobby G. Atkinson, Tucson, Ariz.

[73] Assignee: Raytheon Company, Lexington, Mass.

[21] Appl. No.: 08/982,655

[22] Filed: Dec. 2, 1997

[51] Int. Cl.$^6$ .............................. F42B 15/10; F41F 3/04
[52] U.S. Cl. ..................... 102/380; 89/1.812; 89/1.814
[58] Field of Search ................... 102/374, 380, 102/206, 215, 201; 89/1.813, 1.812, 1.814, 1.81, 1.809, 1.8

[56] References Cited

U.S. PATENT DOCUMENTS

| | | | |
|---|---|---|---|
| 3,712,226 | 1/1973 | Moskowitz et al. | 102/374 |
| 4,324,168 | 4/1982 | Sano et al. | 89/1.814 |
| 4,930,421 | 6/1990 | Macdonald | 102/380 |
| 5,525,970 | 6/1996 | Friedman et al. | 89/1.812 |

*Primary Examiner*—Charles T. Jordan
*Assistant Examiner*—Thereda M. Wesson
*Attorney, Agent, or Firm*—David W. Collins; Glenn H. Lenzen, Jr.

[57] ABSTRACT

A rocket ignition system adapted for use with a missile having a rocket motor is provided. The rocket ignition system comprises (a) a first circuit for detecting an optical impulse and providing a first signal in response thereto; (b) a second circuit for detecting a pressure wave and providing a second signal in response thereto; and (c) a third circuit for launching the missile in response to the first and second signals. The rocket ignition system, which is easily adapted to existing missiles and rocket propelled devices, can reliably distinguish between the firing of a primer and other acoustic events occurring in noisy environments, such as a battlefield.

24 Claims, 3 Drawing Sheets

MISSILE WITH A SAFE ROCKET IGNITION SYSTEM

BACKGROUND OF THE INVENTION

1. Field of Invention

This invention relates to rocket ignition devices. Specifically, the present invention relates systems for triggering the ignition of a rocket motor used to launch rocket propelled devices such as missiles.

2. Description of the Related Art

Rocket propulsion systems are, used in a variety of demanding applications ranging from space shuttle missions to missile launching applications. Such systems require safe and reliable systems for controlling the ignition of accompanying rocket motors.

Safe and efficient rocket ignition systems are particularly important in military applications involving the launch of rocket propelled devices such as missiles from large caliber guns. A large caliber gun includes a propellant primer for activating rocket motors included on the missiles. Ignition of the propellant primer creates an associated light flash and acoustic pressure pulse.

Typical rocket motor ignition systems include a percussion device such as an impact switch to detect the pressure pulse. Once the pressure pulse is detected by the percussion device, the rocket motor ignition system electrically ignites the missile's rocket motor propellant causing missile launch.

However such ignition systems are dangerous in loud environments, as extraneous pressure pulses may result in unintentional missile launch. Such systems are particularly dangerous in battlefield applications where large pressure pulses from nearby artillery fire are common.

Hence, a need exists in the art for a safe rocket ignition system that may be easily adapted to existing missiles and rocket propelled devices. There is a further need for a rocket ignition system that can reliably distinguish between the firing of a primer and other acoustic events occurring in noisy environments such as a battlefield.

SUMMARY OF THE INVENTION

The need in the art is addressed by the rocket ignition system of the present invention. In a most general sense, the invention includes a first circuit for detecting an optical impulse and providing a first signal in response thereto. A second circuit is provided for detecting a pressure wave and providing a second signal in response thereto. A third circuit then launches the missile in response to the first and second signals.

In the illustrative embodiment, the inventive system is adapted for use with a missile having a rocket motor and includes a primer for generating a launch signal having a first and second component of first and second signal types, respectively. A first detector detects a signal of the type of the first component and a second detector detects a signal of the type of the second component. A processor computes the difference between the time elapsed between the receipt of the second component by the second detector and the receipt of the first component by the first detector to a predetermined valid time difference range and provides an ignition signal if the difference is within the predetermined valid time difference range. A pyrotechnic rocket motor ignitor activates the rocket motor upon receipt of the ignition signal from the processor.

In a specific embodiment, the first detector is an optical detector located near the missile rocket motor and the first component is an optical signal. The second detector is a pre-existing pitot pressure sensor located near the nose of the missile and the second component is a pressure signal.

In the illustrative embodiment, the processor is a pre-existing missile guidance control processor that is programmed to compare the time elapsed to the predetermined valid time difference range. The processor includes a timer for measuring the elapsed time. The predetermined valid time difference is computed based on the difference in position between the first detector and the second detector, and the difference in velocities of the first component and the second component.

The safety of the present invention is further enhanced via the use of a safety switch that blocks the ignition signal when the missile is not ready for use.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The following review of a conventional rocket ignition system is intended to facilitate an understanding of the present invention.

Figure 1:
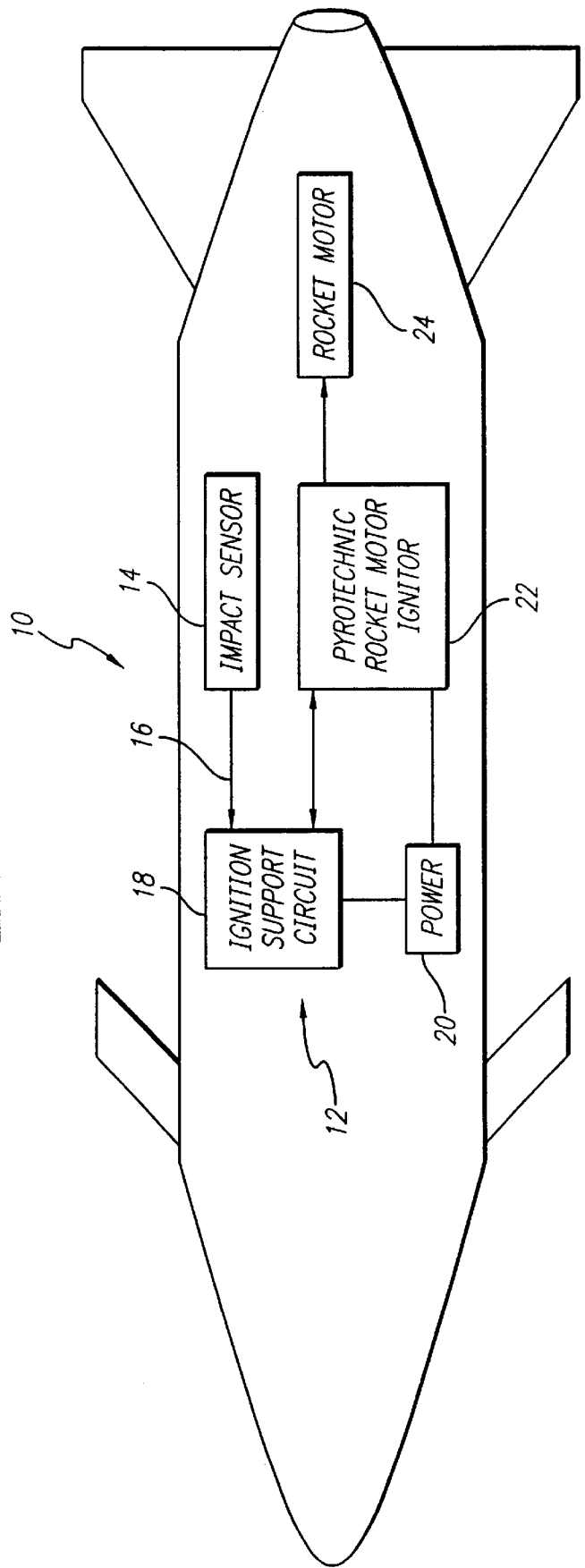
FIG. 1 is a diagram of a missile showing key functional blocks of a conventional rocket motor ignition system.

FIG. 1 is a diagram of a missile 10 showing key functional blocks of a conventional rocket motor ignition system 12. The system 12 includes an impact sensor 14 that detects a pressure pulse from the propellant primer of a gun used to launch the missile 10. When the impact sensor 14 detects a pressure pulse such as a high energy sound wave, the sensor 14 sends pressure pulse detection information 16 to an ignition support circuit 18 that is powered by a power source 20. The ignition support circuit 18 compares the magnitude of the pressure pulse as provided with the pressure pulse detection information 16 to a predetermined threshold. If the detected pressure pulse is greater than the predetermined threshold, a pyrotechnic rocket motor ignitor 22, also powered by the power source 20, is activated by the ignition support circuit 18. The pyrotechnic rocket motor ignitor 22 then fires a rocket motor 24 which initiates the launch of the missile 10.

The impact sensor 14 and the accompanying ignition support circuit 18 may inadvertently trigger firing of the rocket motor 24 by the pyrotechnic rocket motor ignitor 22. This may occur when the impact sensor 14 detects a large pressure pulse or physical impact resulting from exposure to harsh battlefield environments.

Other more dangerous missile ignition system designs omit the ignition support circuit 18 and send the pressure pulse detection information 16 directly to the pyrotechnic rocket motor ignitor 22.

Figure 2:
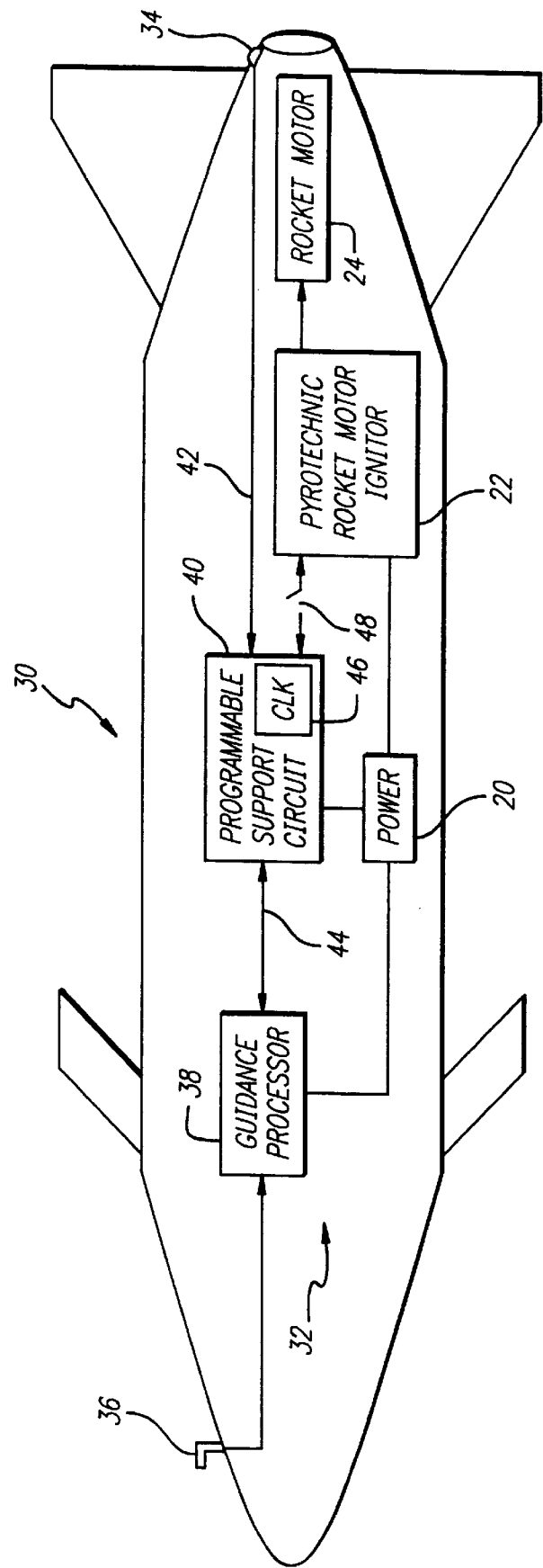
FIG. 2 is a diagram of a missile incorporating the rocket motor ignition system of the present invention.

FIG. 2 is a diagram of an improved missile 30 incorporating a rocket ignition system 32 constructed in accordance with the teachings of the present invention. The rocket ignition system 32 includes an optical sensor 34 mounted near the rear of the missile 30 near the rocket motor 24. The ignition system 32 uses a pitot pressure sensor 36 and a guidance control processor 38, both 36, 38 of which are pre-existing on the missile 30. The pitot pressure sensor 36 is a standard missile flight instrument used to measure missile velocity by sensing external pressure. When the missile 30 is not in flight and is loaded in a gun having a propellant primer (as discussed more fully below), the pitot pressure sensor 36 is used as a pressure pulse detector 36.

A programmable ignition support circuit 40 receives a light signal input 42 from the optical sensor 34 and receives a pressure signal input 44 from the guidance processor 38. The pressure signal input 44 includes information corresponding to pressure pulses received by the pitot pressure sensor 36 that has been passed through the guidance processor 38. The support circuit 40 is programmed to include information about the length of the missile 30, the distance between the pressure sensor 36 and the optical detector 34, the distance between the pressure sensor 36 to the propellant primer, and the distance between the optical detector 34 and the propellant primer.

Firing of the propellant primer creates an optical flash that is immediately detected by the optical detector 34. The optical detector 34 is recessed in the missile 30 to limit the optical detector's 34 field of view to a small range in the direction of the propellant primer. Optical flashes outside of the small range are not detected by the optical detector 34 (as discussed more fully below).

A pressure pulse associated with the firing of the propellant primer arrives at the pressure sensor 36 after a time delay. The time delay is measured by a timer 46 included in the support circuit 40. The time delay is approximately the time required for a pressure pulse traveling at the speed of sound to travel the distance from the propellant primer to the pressure sensor 36 in most applications. This required travel time is used to establish a time range in which the receipt of a pressure pulse following the receipt of the optical signal 42 by the support circuit 40 is considered to represent a valid launch signal. This time range is predetermined for a given missile and given launch setup and stored in the support circuit 40. For a given combination of an optical event and an ensuing pressure pulse, the support circuit 40 checks to see that the time delay is within the acceptable time range and if it is, the support circuit 40 starts the pyrotechnic rocket motor ignitor 22 which fires the rocket motor 24 subsequently launching the missile 30.

When the missile 30 is not ready to be launched, a manual arming switch 48 is left open to ensure the safety of the missile. When the manual arming switch 48 is disconnected, the support circuit 40 can no longer activate the pyrotechnic rocket motor ignitor 22 which is required to start the rocket motor 24.

Those skilled in the art will appreciate that in missiles equipped with programmable guidance control processors, functionality provided by the programmable ignition support circuit 40 may be programmed into such processors obviating the need for the support circuit 40. Also, the programmable ignition support circuit 40 may be equipped with code or logic that performs the necessary time range calculations automatically from information gathered from the guidance processor 38.

Figure 3:
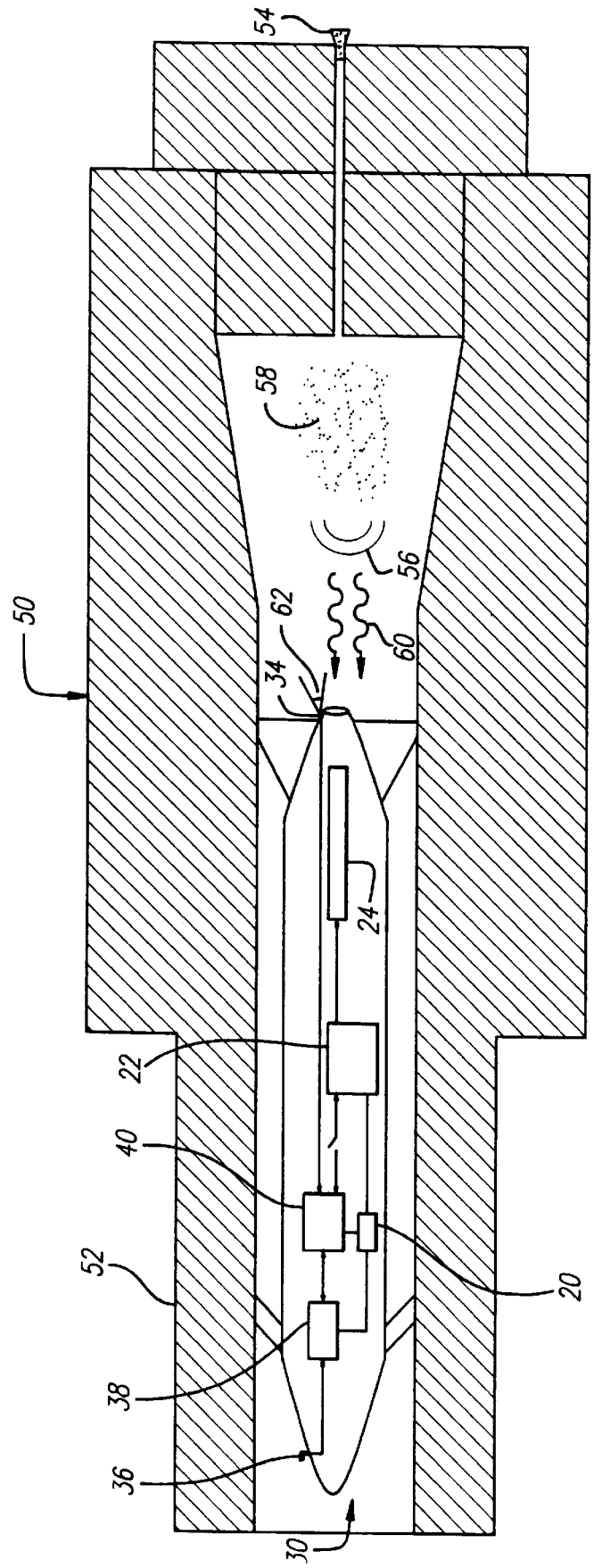
FIG. 3 is a diagram of a large caliber gun loaded with the missile of FIG. 2.

FIG. 3 is a diagram of the missile 32 of FIG. 2 ready to be launched by a large caliber gun 50. The gun 50 includes a gun tube 52 and a propellant primer 54 that when fired creates a pressure pulse 56, a thermal flash 58, and an optical signal 60. The pressure sensor 36 detects the pressure pulse 56 and the optical sensor 34 detects the optical signal 60. The time delay between optical signal detection and pressure pulse detection is used by the ignition system 32 to filter out false ignition signals generated by nearby explosions.

In applications where the time delay calculation must be extremely accurate, the time required for the light 60 to travel from the propellant primer 54 to the optical sensor 34 is factored in to the calculation of the time delay. For example, if the missile's 30 optical sensor 34 is ninety centimeters from the pitot pressure sensor 36 and the optical sensor 34 is eighty centimeters from the propellant primer 54, it will take light, traveling at approximately $3 \times 10^{10}$ centimeters per second, $2.7^{-9}$ seconds to arrive at the optical sensor 34. A pressure pulse 56 from the primer 54 arrives at the pressure sensor 36 in approximately $4.9^{-3}$ seconds. The time delay is $(4.9^{-3} - 2.7^{-9} \approx 4.9^{-3})$ seconds. Measured time delays that deviate from this time delay ($4.9^{-3}$ seconds) by a predetermined threshold are ruled out as possible launch signals.

The farther away the source of the optical flash and associated pressure pulse is from the missile 30, the larger the delay between the times of arrival of the optical 60 signal and the pressure pulse 36 to their associated detectors 34, 36. Similarly, the closer the source of the optical/pressure signals is to the missile 30, the shorter the delay between the times of arrival of the pressure 56 and optical signals 60. Electrical propagation delays within the rocket ignition system 32 may also be measured and factored in the calculations performed by the ignition circuit 40.

The field of view of the optical sensor 34 is limited to a small range 62 in the direction of the propellant primer 54. Flashes occurring outside of this small range 62, which is approximately 20 degrees in the present specific embodiment, are not readily detected by the optical detector 34. The optical detector 34 is slightly recessed in the missile 30 to limit the field of view 62 toward the rear of the missile 30 where the propellant primer 54 is located. The field of view 62 is oriented so that the primer 54 is approximately centered in the field of view 62.

Hence, the present invention provides a high level of safety as only optical/pressure signals generated at one location in a three-dimensional space surrounding the missile 30 will have the characteristics that the rocket ignition system 32 is designed to respond to. That location in space corresponds to the position of the propellant primer 54. While an explosion or an artillery fire nearby will cause a flash and a large pressure pulse, light travels much faster than sound and the pressure pulse would arrive far to late after the flash to have originated from the primer 54.

The rocket ignition system 32 of the present invention achieves a high level of performance while requiring few additional components. This is accomplished by using the missile's 30 pitot pressure sensor 36 in its existing mounting position and the missile's 30 pre-existing flight control microprocessor 38.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A rocket ignition system for use with a missile having a rocket motor comprising:

first means for detecting an optical impulse and providing a first signal in response thereto;

second means for detecting a pressure wave and providing a second signal in response thereto; and third means for launching said missile in response to said first and second signals.

2. The invention of claim 1 wherein said third means includes means for determining a time difference between receipt of said first signal and receipt of said second signal.

3. The invention of claim 2 wherein said third means further includes launch means for launching said missile if said time difference is within a predetermined range.

4. The invention of claim 3 wherein said launch means includes a missile guidance processor and a rocket motor ignitor.

5. The invention of claim 2 wherein said first signal is provided by a primer charge.

6. The invention of claim 5 wherein said first means includes an optical sensor having a field of view that is limited to a small range encompassing said primer charge so that optical signals not originating from the direction of said primer charge are not readily detected.

7. The invention of claim 5 wherein said second signal is provided by said primer charge.

8. The invention of claim 1 wherein said second means includes a pitot pressure detector.

9. A rocket ignition system for use with a missile having a rocket motor comprising:

launch initiation means for generating a launch signal having a first and second component of first and second types, respectively;

detector means for detecting a signal of the type of said first component and for detecting a signal of the type of said second component;

processor means for comparing the time elapsed between receipt of said second component by said detector means and the receipt of said first component by said detector means to a predetermined valid time difference range and providing an ignition signal if said difference is outside of said predetermined valid time difference range; and ignition means for activating said rocket motor upon receipt of said ignition signal from said processor means.

10. The invention of claim 9 wherein said detector means includes a first and second detector.

11. The invention of claim 10 wherein said second detector is a pressure detector located near the nose of said missile.

12. The invention of claim 11 wherein said second component is a pressure signal.

13. The invention of claim 10 wherein said first detector is an optical detector located near the rocket motor of said missile.

14. The invention of claim 13 wherein said first component is an optical signal.

15. The invention of claim 10 wherein said launch initiation means is a propellant primer.

16. The invention of claim 9 wherein said ignition means includes a pyrotechnic rocket motor ignitor.

17. The invention of claim 9 wherein said processor means includes a guidance control processor programmed to compare said time elapsed to said predetermined valid time difference.

18. The invention of claim 17 wherein said processor includes a timer for measuring said time elapsed.

19. The invention of claim 18 wherein said predetermined valid time difference is computed based on the difference in position between the first detector and said second detector, and the difference in velocities of said first component and said second component.

20. The invention of claim 9 further including a safety switch for blocking said ignition signal when said missile is not ready to be used.

21. A method of igniting a missile having a rocket motor comprising:

detecting an optical impulse and providing a first signal in response thereto;

detecting a pressure wave and providing a second signal in response thereto; and launching said missile in response to said first and second signals.

22. A rocket ignition system for use with a projectile having a rocket motor comprising:

a propellant primer for producing a launch signal, said launch signal having a pressure component and an optical component, said propellant primer fired at a first moment in time;

optical detection means for detecting an optical signal;

pressure means for detecting a pressure signal;

timer means for measuring a first elapsed time between said first moment in time and receipt of said optical signal by said optical detection means and for measuring a second elapsed time between said first moment in time and receipt of said pressure signal by said pressure means; and processor means for comparing the difference between said first elapsed time and said second elapsed time to a predetermined valid time to verify that said optical signal is said optical component and that said pressure signal is said pressure component, and providing an ignition signal if said difference is within a predetermined range of said predetermined valid time; and ignition means for actuating said rocket motor in response to receipt of said ignition signal.

23. A missile system comprising:

a rocket motor;

ignition means for providing an ignition signal if the difference between the time of arrivals of a first and second signal component of a received signal are within a predetermined time range indicating that said received signal is a launch signal;

rocket starter means for firing said rocket motor and propelling said missile into flight in response to receipt of said ignition signal; and guidance control means for directing said missile flight.

24. A method for authenticating a launch signal produced by a propellant primer of a gun used to fire a projectile having a rocket motor comprising the steps of:

installing an optical sensor and a pressure sensor on said projectile if said projectile does not already include an optical sensor and a pressure sensor;

measuring a first distance between said pressure sensor and said propellant primer and a second distance between said optical sensor and said propellant primer when said projectile is in the launch position;

computing based on said first distance and said second distance an expected time delay range between receipt of a primer optical signal by said optical sensor, and receipt of a primer pressure signal by said pressure detector; and actuating said rocket motor upon receipt of a pressure signal by said pressure detector and receipt of an optical signal by said optical detector if the time delay between said receipt of said pressure signal and said receipt of said optical signal is within said expected time delay range indicating that said pressure signal is said primer pressure signal and said optical signal is said primer optical signal.

* * * * *